Nov. 19, 1957 G. C. HUGHES 2,813,542
GAS PRESSURE REGULATOR
Filed Nov. 23, 1954

INVENTOR.
GEORGE C. HUGHES
BY
*Dales, Teare, & McLean*
ATTORNEYS

United States Patent Office 2,813,542
Patented Nov. 19, 1957

2,813,542

GAS PRESSURE REGULATOR

George C. Hughes, Anderson, Ind., assignor to Reynolds Gas Regulator Company, Anderson, Ind., a corporation of Indiana Application November 23, 1954, Serial No. 470,709

3 Claims. (Cl. 137—505.46)

This invention is concerned with improvements in or relating to a gas pressure regulator, and particularly to a gas pressure regulator which, when installed on a gas consumer's premises, will serve as a gas meter bar. These therefore are the general objects of the present invention.

It has become general practice in many gas consumer installations to facilitate the installation and/or replacement of gas meters by terminating the consumer's service and gas supply lines with respective downward extending parallel conduits with their lower ends in the same horizontal plane and spaced a predetermined distance apart. This permits the gas meter to be installed or replaced without disturbing the service or supply lines. It is customary to insure the positioning by tying the two conduits together adjacent their ends with a rigid spacing or meter bar. Such bar also protects the meter from strains which otherwise might be transmitted thereto by the conduits. In many consumer installations a gas pressure regulator is required to reduce the pressure of the gas flowing from the supply line to the consumer's service line. Such regulators may be placed in either the supply line or the service line.

The present invention contemplates the provision of a gas pressure regulator which will serve as a meter bar, and which may be repaired or replaced without disturbing the connecting conduits or the meter connections, and which may be used with various types of meters even though spacing between the inlet and outlet connections of such meters is not alike. These, therefore, are more specific objects of the present invention.

Other objects and advantages of the invention will become more apparent from the following description, reference being had to an embodiment of the invention illustrated in the accompanying drawings in which.

Figures 1, 2, 3:
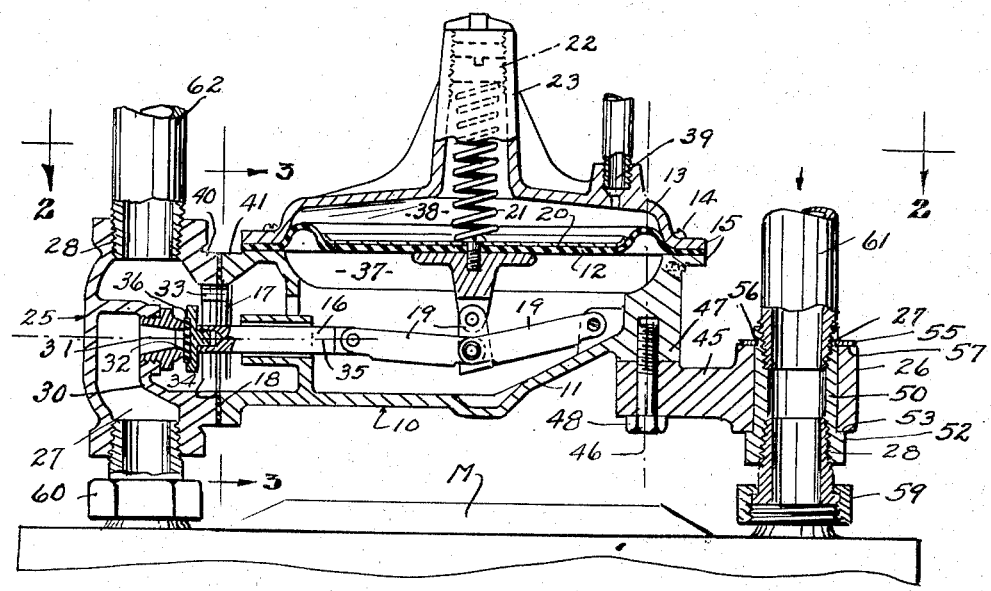
Fig. 1 is a vertical section through the improved gas pressure regulator illustrating its use as a meter bar, the plane of the section being indicated by the lines 1—1 on Fig. 2.
Fig. 2 is substantially a plan view of the regulator as indicated by the lines 2—2 of Fig. 1.
Fig. 3 is a sectional detail, the plane of which is indicated by the lines 3—3 on Fig. 1.

In the drawings, the improved gas pressure regulator is shown as including housing 10, having a lower hollow housing member 11 the upper end of which is closed by a flexible pressure responsive diaphragm 12. This diaphragm is held in position on the member 11 by an inverted cap-like housing member 13 which is secured to the member 11 by bolts 14. The periphery of the diaphragm 12 is clamped between peripheral flanges 15 of the housing members. The housing member 11 supports a valve stem 16 for movement in a horizontal plane. This stem projects outward through an opening 17 formed in a vertical side wall 18 of such member and is connected by linkage 19 with the diaphragm 12 to cause the valve stem to reciprocate in response to the vertical movement of the diaphragm. The diaphragm 12 is biased in a downward direction to withdraw the valve stem 16 into the housing 10 by the weight of the connecting linkage 19, the weight of an upper diaphragm supporting plate 20 and by a spring 21 which is interposed between the upper diaphragm plate 20 and an adjustable abutment 22 carried by an upwardly extending boss-like formation 23 of the housing member or cap 13.

Adjustably secured to opposite ends of the housing 10 are a pair of body members 25 and 26 each of which is provided with vertically aligned inlet and outlet openings 27 and 28 respectively, which are adapted to receive the threaded ends of respective conduits. The inlet and outlet openings 27 and 28 of the body member 25 are separated by a partition wall 30 having a valve port opening 31 extending therethrough. In the embodiment illustrated this opening is provided with a removable valve seat 32 which faces an opening 33 formed in a vertically extending side wall 34 of the body member. The arrangement is such that when the body member 25 is secured to the housing 10, as will hereinafter be described, the opening 33 in the body member aligns with the opening 17 of the housing 10, and the valve stem 16 extends through such openings in axial alignment with the valve port opening 31. The valve stem is provided with a valve member 36 which coacts with the valve seat member 32 to control the flow of gas from the outlet to the inlet of the body member 25. The aligned openings 33 and 17 also bring the chamber 37 of the housing member 11, which lies below the diaphragm 12, into communication with the outlet opening 28 of the body 25. The fluid pressure in the chamber 38 above the diaphragm 12 is maintained at atmospheric pressure by a vent opening 39 formed in the upper housing member 13.

The body 25 and housing member 11 are so related that the body member 25 may be secured to the housing member with its inlet opening 27 facing downward and its outlet opening 28 facing upward as shown in Fig. 1, or with such openings in reversed positions. For this purpose the body 25 and the housing 10 are provided with flanges 40 and 41 respectively through which four equally spaced bolts 43 extend. The body 25 may be rotated about the horizontal axis 35 of the valve stem 16 to the desired position.

The body member 26 is provided with a horizontally extending arm 45 which underlies a boss 47 formed at the end of the housing 10 opposite the body 25. The arm 45 is secured to the housing by a stud or bolt 48 which threadingly engages the housing 10.

To facilitate the connection of piping to meter "M" the inlet and outlet openings 27 and 28 of the body 26 are formed in opposite ends of a sleeve 50 which is mounted in the outermost end of the body 26 for rotation about the vertical axis of such openings. This sleeve is provided at its lower end with an annular boss 52 to provide an upwardly facing shoulder 53 which engages the lower face of the body 26. The sleeve is held in position by resilient split metal retaining ring or spring member 55 which seats in an annular recess 56 formed in the upper end of the sleeve, and which engages the upper face 57 of the body member 26.

In operation the downwardly facing openings of the bodies 25 and 26 are secured to the meter by pipe unions 59 and 60, while the supply and service line conduits 61 and 62 are threaded into the upward facing openings of such bodies. As illustrated in Fig. 1 gas will flow through the supply conduit 61, the body member 26, the union 60 to the meter "M" and from the meter through the union 59 to the body 25 and thence into the service conduit 62, the pressure of the gas flowing through the bodies 25 being controlled by the outlet pressure thereof through the medium of the pressure responsive diaphragm 36 in the usual manner.

To adapt the regulator for meters having different inlet and outlet spacings one loosens the bolt 48 and swings the body member 26, the vertical axis 46 of such bolt thereby decreasing or increasing the distance between the conduit connections for the two body members as desired, whereupon the bolt 48 is tightened to provide a rigid structure which may act as a meter bar.

When it is desired to inspect or replace the operating mechanism of the regulator the bolts 43 and 48 are removed whereupon the regulator housing 10 together with the valve member 26, the diaphragm 12, and the linkage 19 may be removed as a unit from the installation without disturbing the meter "M" or any of the piping connections. After the regulator housing has been removed the valve seat member 32 may be replaced, the regulator mechanism repaired, or the entire regulator housing 10 together with its associated parts may be replaced by a new unit. When it is desired to replace the meter "M" the unions 59 and 60 may be separated to permit such removal, whereupon the pressure regulator acting as a meter bar will hold the unions in position.

I claim:

1. In a combined gas pressure regulator and meter bar and a pair of hollow bodies each having vertically aligned oppositely facing inlet and outlet openings adapted to receive respective inlet and outlet conduits, the first of said bodies having an unobstructed passageway extending from its inlet to its outlet, the second of said bodies having a partition wall provided with a valve port opening separating its inlet and outlet and a vertically extending side wall having a horizontally extending opening extending therethrough, a regulator housing disposed between said bodies and having a vertically extending side wall having an opening extending therethrough and adapted to abut the side wall of said second body, releasable means to secure the second body rigidly to the housing with either the inlet or outlet opening thereof facing downward, pressure responsive means mounted in said housing and projecting into the second body to control the flow of gas through the valve port, releasable means to secure said first named body rigidly to the housing, said bodies being separable from said housing by movement of the housing in a vertical plane, whereby regulator when connected with a meter and with supply and service conduits will act as a rigid meter bar and yet permit removal of the regulator housing and pressure responsive mechanism as a unit without disturbing the connections with the supply or service line conduits or the connections with the meter.

2. In a combined gas pressure regulator and meter bar a pair of hollow bodies each having vertically aligned oppositely facing inlet and outlet openings adapted to receive respective inlet and outlet conduits, the first of said bodies having an unobstructed passageway extending from its inlet to its outlet, the second of said bodies having a partition wall provided with a valve port opening separating its inlet and outlet and a vertically extending side wall having an opening extending therethrough, a regulator housing disposed between said bodies and having a vertically extending side wall having an opening extending therethrough and adapted to abut the side wall of said second body, releasable means to secure the second body rigidly to the housing with either the inlet or outlet opening thereof facing downward, pressure responsive means in said housing and projecting into the second body to control the flow of gas through the valve port, releasable means to secure said first body rigidly to the housing and including means to guide the first body for movement about a vertical axis relative to said housing when released, said axis being offset horizontally from the vertically aligned openings of said bodies, said housing being separable from said bodies by movement of the housing vertically, whereby regulator when connected with a meter and with supply and service conduits will act as a rigid meter bar and yet permit removal of the regulator housing and pressure responsive mechanism as a unit without disturbing the connections with the supply or service line conduits or the connections with the meter.

3. In a combined gas pressure regulator meter bar a hollow body member having vertically aligned oppositely facing inlet and outlet openings adapted to receive respective inlet and outlet conduits and a partition wall separating said inlet and outlet openings and having a valve port extending therethrough, said body having a vertically extending side wall provided with an opening extending therethrough, a second body, a sleeve having aligned outlet and inlet openings adapted to receive outlet and inlet conduits, said sleeve being mounted for rotation about a vertical axis in said body with the axis of its openings in alignment with its axis of rotation, a pressure regulator housing disposed between and detachably secured to said bodies, said regulator body having a vertical side wall having an opening extending therethrough and adapted to align with the opening in the side wall of the first body, pressure responsive means in said housing and releasable means to rigidly secure said first named body to said housing with either of its openings facing downward, means pivotally connecting said second body to said housing for movement about a vertical axis offset from the axes of said body openings and including releasable means to secure the second body to said housing to form a rigid structure, whereby regulator when connected with a meter and with supply and service conduits will act as a rigid meter bar and yet permit removal of the regulator housing and pressure responsive mechanism as a unit without disturbing the connections with the supply or service line conduits or the connections with the meter.

References Cited in the file of this patent

UNITED STATES PATENTS

| | | |
|---|---|---|
| 968,021 | Youngs | Aug. 23, 1910 |
| 1,287,895 | Coyle | Dec. 17, 1918 |
| 1,851,860 | McKee | Mar. 29, 1932 |
| 1,887,999 | Fow | Nov. 15, 1932 |
| 2,231,696 | Wolfe | Feb. 11, 1941 |
| 2,698,026 | Roberts | Dec. 28, 1954 |